United States Patent [19]
Zilic et al.

[11] Patent Number: 4,718,682
[45] Date of Patent: Jan. 12, 1988

[54] FOUR JAW RADIAL CHUCK

[76] Inventors: Antun Zilic, 389 Police Road; Robert B. Angrakian, 2 Medoro Grove, both of Mulgrave, Victoria 3170, Australia

[21] Appl. No.: 666,907

[22] Filed: Oct. 31, 1984

[30] Foreign Application Priority Data

Nov. 4, 1983 [AU] Australia ............... PG2210

[51] Int. Cl.⁴ ............................................. B23B 31/12
[52] U.S. Cl. ..................................... 279/116; 279/1 J
[58] Field of Search ................... 279/1 J, 1 L, 1 DC, 279/1 DA, 114, 115, 116

[56] References Cited

U.S. PATENT DOCUMENTS

| | | | |
|---|---|---|---|
| 1,713,802 | 5/1929 | Whiton | 279/114 |
| 1,727,535 | 9/1929 | Conradson | 279/116 |
| 1,772,203 | 8/1930 | Bush | 279/114 |
| 1,971,638 | 8/1934 | Berg | 279/112 |
| 2,825,572 | 3/1958 | Sloan et al. | 279/1 J |
| 2,883,201 | 4/1959 | Goodrum | 279/113 |
| 3,975,030 | 8/1976 | Alreel et al. | 279/1 J X |

FOREIGN PATENT DOCUMENTS

| | | | |
|---|---|---|---|
| 34842 | 6/1885 | Fed. Rep. of Germany | |
| 2512429 | 9/1976 | Fed. Rep. of Germany | |
| 8000427 | 3/1980 | Sweden | 279/1 J |
| 335167 | 9/1930 | United Kingdom | |
| 336597 | 10/1930 | United Kingdom | |
| 2068791 | 8/1981 | United Kingdom | |

*Primary Examiner*—Gil Weidenfeld
*Assistant Examiner*—Glenn L. Webb
*Attorney, Agent, or Firm*—Larson and Taylor

[57] ABSTRACT

A chuck especially for a machine tool that operates in a universal manner as a two, three or four jaw chuck. The chuck (10) comprises four jaws (25) arranged in diametrically opposed pairs on the front face (12) of the chuck (10). The chuck (10) including drive pinions (36, 37) that drive a scroll (39, 239) that co-axially carries a differential gear train including a pair of differential gears (50, 51) one driving one pair of jaws (25) and the other driving the other pair whereby the differential gear train apportions the drive between the pair of jaws so that one pair may move independently of the other pair.

7 Claims, 4 Drawing Figures

FOUR JAW RADIAL CHUCK

This invention relates to chucks for machine tools or other machines where accurate location and support of a workpiece or cutting tool is required.

An important integer of any machine tool is the chuck, that is the component that either holds the workpiece or holds the tool that operates on the workpiece. In a lathe the workpiece is held for rotation by a chuck. The chuck is driven to rotate and it is very important that the workpiece rotates about the rotational axis of the chuck. Conventional chucks come with two, three or four jaws. The jaws are normally adjustable to clamp the workpiece to the centre of the chuck. Where a circular workpiece is used it is conventional to use a three jaw chuck in which the jaws are self-centering. In this manner adjustment of one jaw causes adjustment of the other two jaws to ensure that the jaws move equally. In this manner it is a simple exercise to locate a circular workpiece centrally of the chuck.

When non-circular workpieces are utilized it is more conventional to use four jaw chucks. Each jaw is equally spaced around a circular housing and it is usual practice for each jaw to be separately adjustable. Consequently the operator of a machine by using various means of measurement such as feeler gauges and contact gauges slowly and incrementally adjusts each jaw until the workpiece is mounted centrally of the chuck. Consequently setting up a four jaw chuck is a very time-consuming exercise. Although self-centering four jaw chucks are known each jaw moves the same distance and consequently if the workpiece is elongate in any one direction all the jaws will not engage the workpiece. Furthermore even in the situation where a square workpiece is used there is a danger that unless the workpiece is accurately dimensioned because of eccentricities all the jaws will not exert the same pressure on the workpiece and consequently the location of the workpiece will be detrimentally effected.

It is usual practise to have two, three or four chucks with any lathe and it is one of the duties of the operator to change the chuck depending on the operation that has to be performed. The changeover process is a lengthy and time-consuming business. These problems are particularly acute in numerical control machines where high speed machining is the ultimate aim. Often the efficiency of numerical control machines is reduced not by the actual machining process but by the time wasted in changing and setting up chucks.

It is an object of the present invention to provide a chuck that overcomes many of these problems.

According to one aspect of the present invention there is provided a chuck for holding an article or tool comprising a circular housing having four jaws spaced around the housing in diametrically opposed pairs, each jaw being radially displaceable, drive means to cause the radially displacement of the four jaws, said drive means including a differential gear train to apportion the drive between the pairs of said jaws so that one pair may move independently of the other pair.

Preferably the drive means comprises a circular scroll mounted within the housing to be rotatably within said housing, the scroll being driven by at least one key operated drive pinion.

In a preferred embodiment a pair of differential gears are mounted in a parallel spaced apart manner coaxial with said scroll, said differential gears being interconnected by at least a pair of differential pinions spaced between and meshing with the gears and mounted on the scroll to impart motion from the scroll to the differential gears.

Preferably each differential gear is arranged to drive a pair of drive shafts, each of which, in turn, drives a jaw of the chuck so that, in use, one pair of diametrically opposed jaws is driven by one differential gear and the other pair is driven by the other differential gear.

According to a further aspect of the present invention there is provided a chuck for a machine tool comprising a cylindrical housing having opposed axially inner and outer surfaces, four jaws equally spaced around the outer surface of the housing in diametrically opposed pairs, each jaw being radially displaceable, a circular scroll mounted co-axially within said housing to be axially rotatably thereto by a key operable drive pinion mounted within the wall of the housing, said scroll carrying a pair of co-axially mounted differential gears inter-connected by at least one differential pinion, the pinion being mounted on the scroll to impart rotation from the scroll to the differential gears so that said scroll is rotatable relative to each differential gear but rotation of the scroll can directly transmit the same rotation to both differential gears, each said differential gear being coupled to one pair of jaws so that rotation of one differential gear causes linear radial movement of one pair of jaws and one pair of jaws can be moved with the other pair held stationary.

Two embodiments of the present invention will now be described by way of example only with reference to the accompanying drawings in which.

It is understood that the drawings illustrating the embodiments of this invention illustrate the principles of operation of the chuck and do not necessarily reflect the true physical arrangement of the components.

Figure 1:
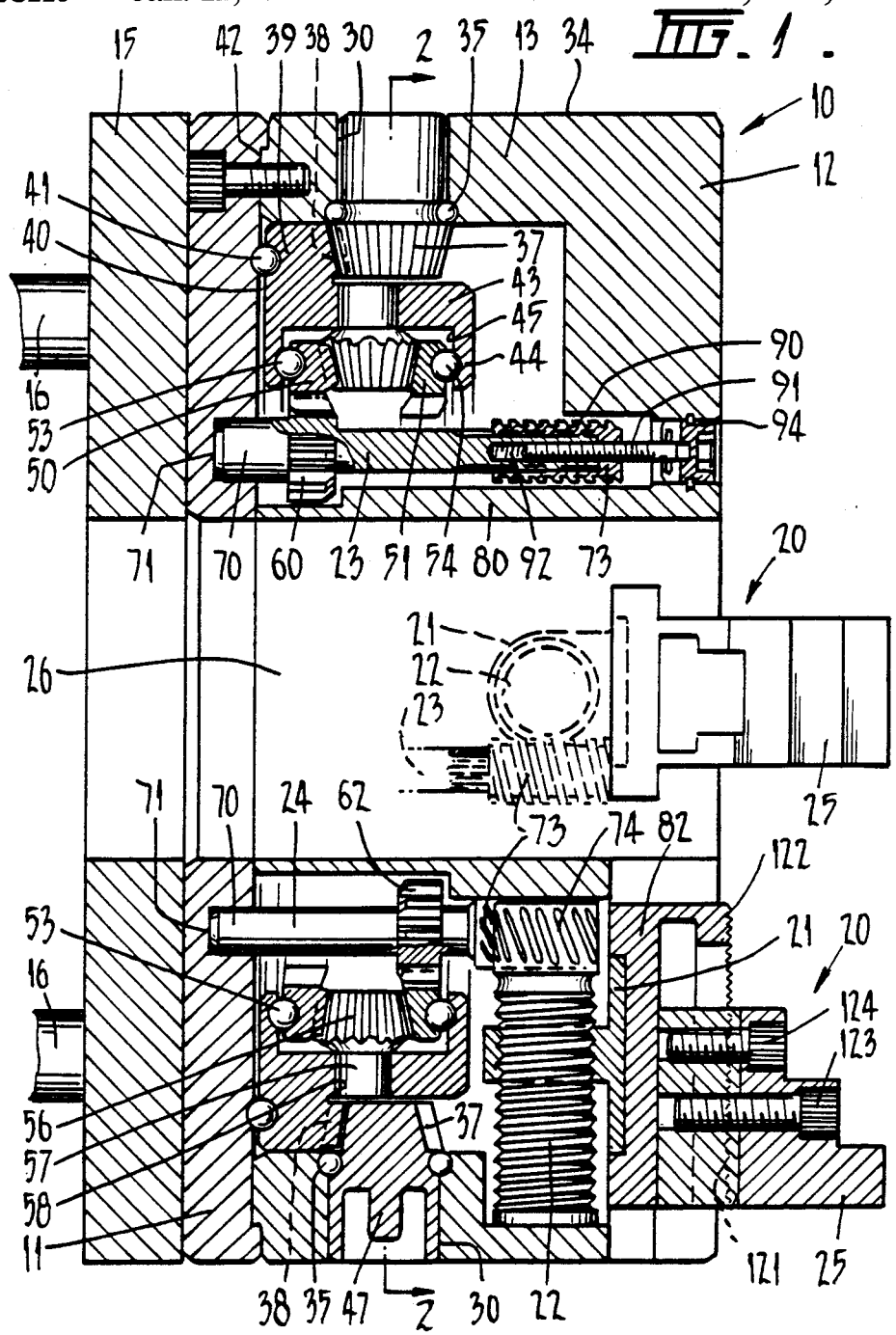
FIG. 1 is a stepped cross-sectional view of a chuck for a lathe taken along the lines 1—1 of FIG. 2 and illustrating one form of chuck.
Figure 2:
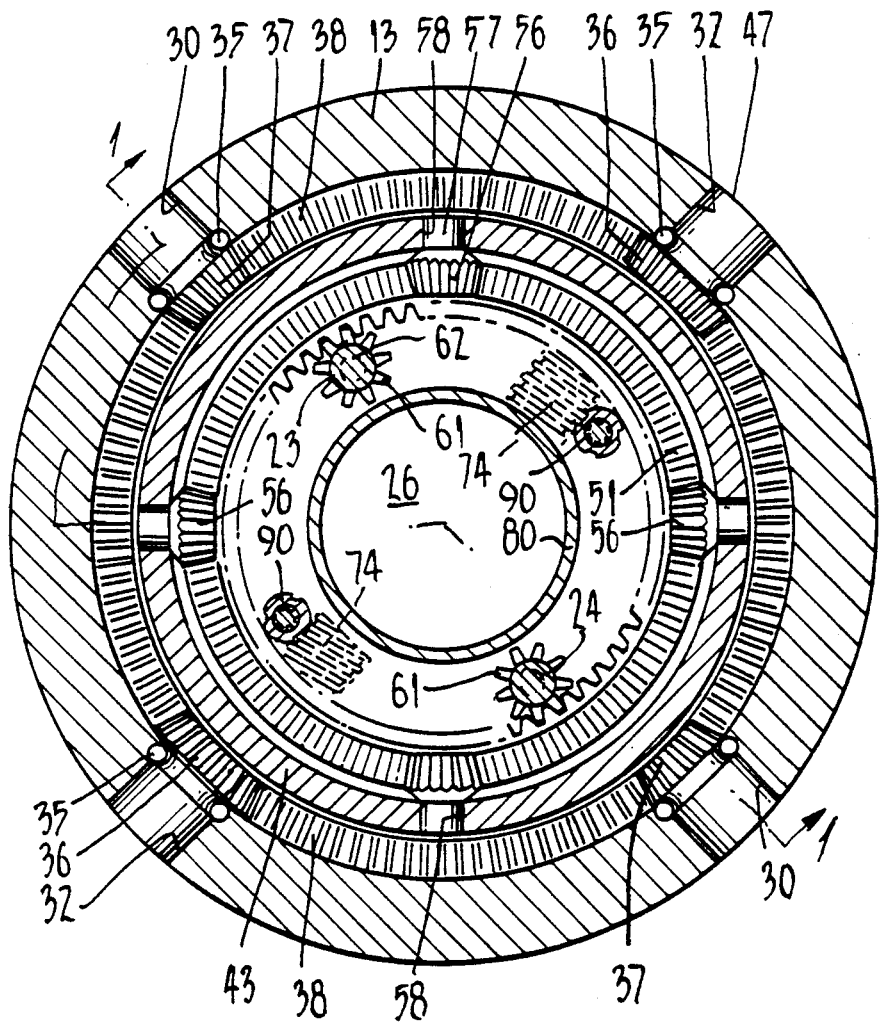
FIG. 2 is a cross-sectional view taken along the lines 2—2 of FIG. 1.

A chuck constituting a first embodiment is illustrated in FIGS. 1 and 2 of the accompanying drawings and comprises a cylindrical housing 10 that comprises an axially inner annular end plate 11, bolted to a cylindrical sleeve assembly 13 that is integrally formed with an axially outer end plate 12. The end plates are bolted or otherwise secured to the sleeve assembly 13. The axially inner end plate 11 of the housing is arranged to be co-axially secured to a mounting plate 15 that has projecting studs 16 to facilitate the attachment of the chuck on the spindle of a machine tool (not shown). The various means for mounting and securing the chuck onto the machine tool spindle are considered well known to those skilled in the art and in consequence are not described herein.

The outer end plate 12 of the housing supports four jaw assemblies 20, (two of which are shown in FIG. 1) that are mounted equally spaced around the face of the end plate to be displaceable in radially extending slots. The slots are arranged equally spaced in diametrically opposed pairs. Each jaw assembly 20 is attached to a boss 21 that is linearly displaced by a worm gear 22 that is in turn driven by the end 73 of a drive shaft 23, 24. The boss and worm gear assembly 21, 22 allows rotation of the drive shaft to be described into the linear radial movement of the jaw assembly 20. The chuck housing is provided with a centrally positioned throughway 26 that allows both location of the chuck onto the spindle of the machine tool and also provides access to the end of the workpiece when located within the jaws of the chuck.

The housing sleeve 13 is provided with four equally spaced apertures 30, 31, 32, 33 on its periphery 34. Each aperture is arranged to support, about bearings 35, a bevelled pinion 36, 37 that is driven from the exterior of the chuck by a suitable key that engages a socket 47 (not shown). The gear of each pinion is arranged to mesh with an annular bevelled gear 38 furnished by a circular scroll 39. The scroll 39 has an axially inner face 40 that is arranged to run against the inner face 42 of the end plate 11 about bearings 41. The scroll 39 is also provided with an axially extending cylindrical cage 43. The cage 43 is provided with a radially inwardly extending annular lip 44 to define a cylindrical housing within the scroll 39. A pair of differential gear rings 50, 51 are mounted in a parallel spaced apart manner within the cage 43 to run against bearings 53, 54. The differential gear rings 50, 51 are held in a spaced apart manner by four equally spaced planetary pinions 56 that are arranged to rotate in a free wheel arrangement on stub axles 57 located within apertures 58 provided in the wall of the cage 43 of the scroll.

The arrangement is such that when a key is fitted to a drive pinion 36 this causes rotation of the scroll 39 within the housing of the chuck. Rotation of the scroll 39 and cage 43 in turn causes rotation of the differential gear rings 50 and 51.

Each differential gear ring 50, 51 is arranged to mesh with a pair of bevelled gears 60, 61, 62, 63 each of which forms part of diametrically opposed drive shafts 23 and 24. One end 70 of each drive shaft is mounted to be rotatable within a recess 71 provided in the outer end plate 11 of the housing and the opposite end 73 meshes with the bevelled end 74 of the worm gear 22 that in turn drives the boss 21 that is coupled to the jaw assembly 20 of the chuck.

The effect of the differential gear rings is to allow one pair of drive shafts 23 to be driven whilst the other pair 24 remains stationary. In the event that the pair of drive shafts 24 driven by the outer differential ring 51 are held stationary by the respective jaws engaging a workpiece, continued rotation of the drive pinion will cause the rotation of the scroll 39 to be transmitted to the other differential gear ring 50 through the differential pinions 56. In this way the drive shafts 23 on the other differential gear ring 50 will rotate until the associated jaws also engage the workpiece.

When, the first set of jaws engage the workpiece, they move the workpiece to centre it relative to the chuck along one axis. The second set of jaws then move to engage the workpiece and cause the workpiece to move to be centred on the other axis relative to the chuck. Further rotation of the drive pinion has the effect of causing the jaws 25 to come into firm and positive engagement with the workpiece. The differential gear rings 50 and 51 ensure that all the jaws firmly and positively engage the workpiece. The manner in which the jaws are driven ensures that each jaw moves the same distance as the opposite jaw of its pair therefore ensuring equal and concentric movement. The positive drive through the gear teeth also ensures that at all times the jaws seek to find a position that causes a workpiece to rotate about the rotational axis of the chuck. Consequently eccentric mounting of the workpiece about the chuck is avoided at all times.

Although there is no need to adjust each jaw to centre the workpiece as would be the case in conventional four jaw chucks, there are situations where separate adjustment is desirable.

As shown in FIG. 1 the jaw assembly 20 comprises a jaw 25 that is bolted to a support member 82 that is in turn secured to the boss 21 co-axially engaging the worm gear 22. The boss 21 is driven by the worm 22 by its end 74 meshing with the end 73 of the drive shaft 24. The jaw 25 has a serrated undersurface 121 which mates with a correspondingly serrated surface 122 formed on the outer surface of the member 82. By suitable bolts 123, 124 the jaw is attached to the member 82 and the position of the jaw radially with respect to the member 82 can thus be adjusted by varying the intermeshing positions of the surfaces 121 and 122. This means of adjustment provides minimum increments of 1 mm. Although (not shown) suitable marking would be provided on the chuck face to ensure that in normal usage a position symmetrical with the opposite jaw would be selected to ensure normal axial centering. For fine adjustment, means is provided to incrementally move the jaw through 1 mm of linear movement.

The geared end 73 of the drive shaft is carried by a hollow sleeve 90 that is in co-axial threaded engagement on the end of the drive shaft 23. A rotatable pin 91 is secured centrally of the sleeve 90 and is in threaded engagement within a centrally positioned threaded bore 92 at the end 73 of drive shaft. The pin 91 is driven by a keyed socket 94 in the face of the chuck. A scale (not shown) is provided on the face of the chuck to calibrate the rotation of the socket 94.

To implement fine adjustment of the jaw the socket 94 is rotated with a key to turn the pin 91 to screw into the bore 92 and cause the sleeve 90 to rotate on the end of the shaft 23 to in turn cause rotation of the worm 22. Rotation of the worm 22 causes radial displacement of the boss 21 and the jaw 25. The rotation of the sleeve 90 relative to the drive shaft 23 is absorbed by longitudinal movement of the pin 91 within the threaded bore 92 in the end 73 of the drive shaft 23.

The embodiment illustrated in FIGS. 1 to 2 suffers from the disadvantage that it is difficult to use the chuck in the form of a conventional four jaw chuck, that is with the capacity to fully adjust each jaw of the chuck. Although adjustment of each jaw can be effected by repositioning the jaw 25 relative to the jaw support 82 and fine adjustment may be implemented by rotation of the screw-threaded rod 91 into the end 73 of the drive shaft 23, this means of adjustment does not provide a full range of adjustment of each jaw in a single action such as by rotation of a drive pinion. Furthermore the fine adjustment is limited by the degree of longitudinal movement that the sleeve 90 can make on the end 73 of the drive shaft.

In the embodiment illustrated with reference to FIGS. 3 and 4 the chuck whilst providing the universal features of the chuck illustrated in FIGS. 1 and 2 also is provided with means to allow, if necessary, full separate adjustment of each jaw. In this manner the chuck can operate as a truly universal chuck, that is namely having all the features of a conventional four jaw chuck and the self-centering features of a three jaw chuck.

Without repeating the description of the chuck illustrated in FIGS. 1 and 2 the major differences between the chucks of the two embodiments are discussed hereunder. The same reference numerals are used for identical components.

Figure 3:
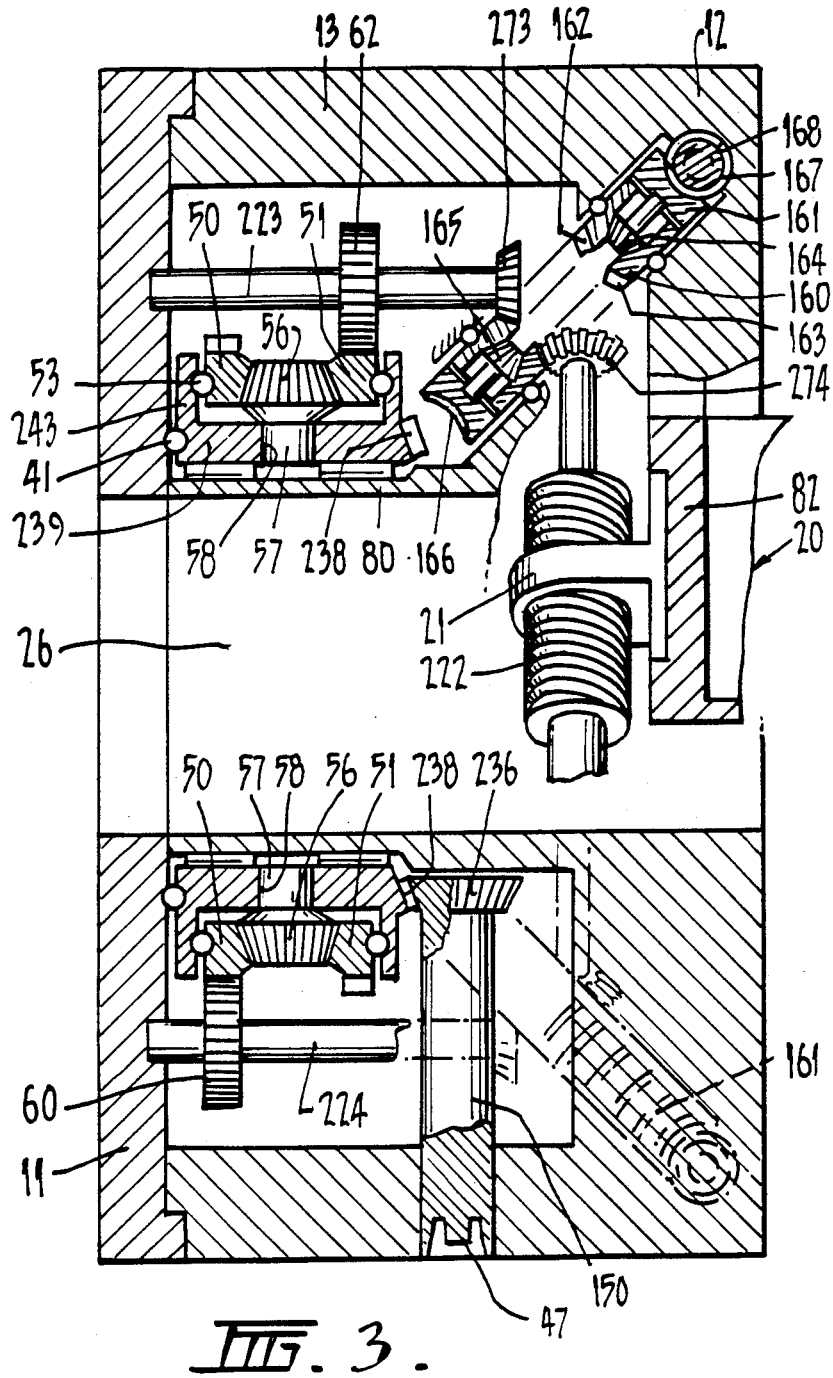
FIG. 3 is a stepped sectional view from the side of another form of chuck with some parts either eliminated or illustrated perspectively for clarity.
Figure 4:
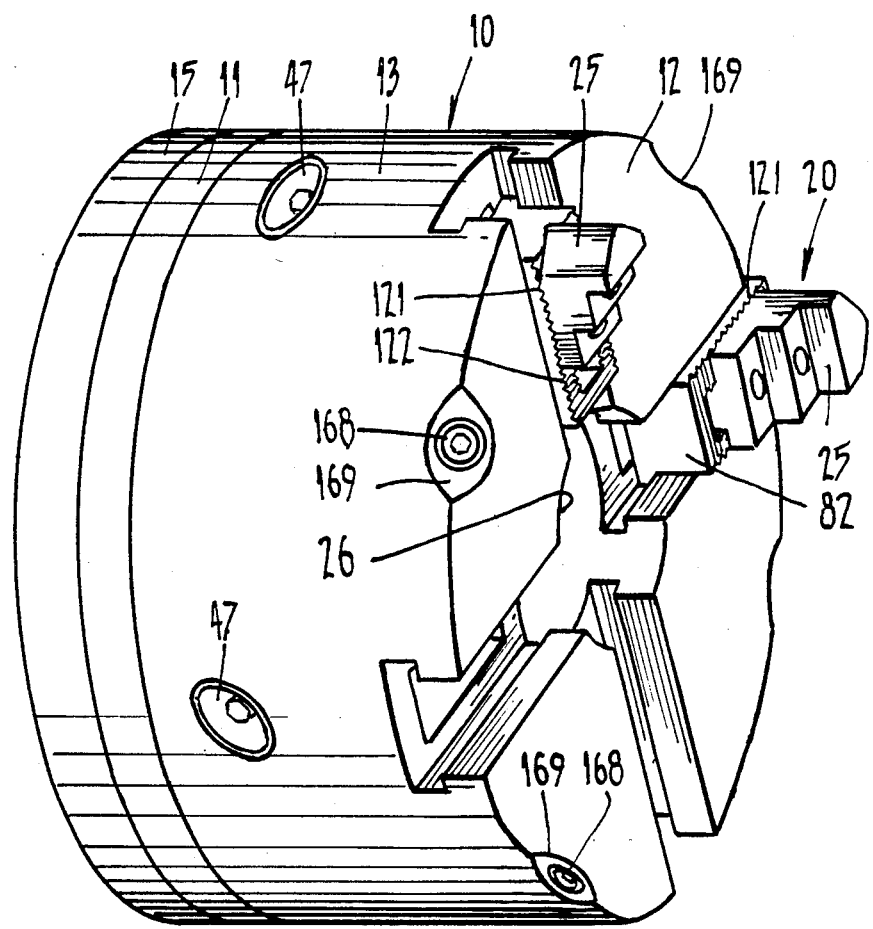
FIG. 4 is a perspective view of the chuck shown in FIG. 3.

In the chuck illustrated in FIGS. 3 and 4 the scroll 239 is provided with its bevelled gear 238 on a much smaller diameter and adjacent the internal sleeve 80 of the chuck. The cage 243 projects radially outwardly from the bevelled gear 238 and in a similar manner to the cage 43 of the first embodiment supports the pair of spaced apart differential gears 50 and 51 about differential planetary pinions 56 that are in this embodiment faced radially outwardly to engage the bevelled faces of the differential gears 50 and 51. Stub axles 57 of the pinions extend radially from apertures 58 provided in the wall of the cage 243 of the scroll. To drive the scroll, the bevelled drive pinion 236 is provided with an elongate shaft 150 to allow transmission of the desired rotary motion from the socket 47. A pair of drive shafts 223 and 224 (only one shaft of each pair is shown in FIG. 3) are driven one by each differential gear as in the chuck of the first embodiment. The only difference being that the drive shafts are driven by the radial extremities of the differential gears in the embodiment illustrated in FIGS. 3 and 4 whilst the drive shafts are driven by the inner surfaces of the gears in the chuck of the first embodiment.

As shown in FIG. 4, the jaw assemblies 20 are secured to slide radially within diametrically opposed slots in the front face of the chuck in the same manner as the first embodiment and are driven by a boss 21 that is in screw-threaded engagement on an elongate worm 222. However, the means of driving the worm 222 from the drive shaft 223 is changed as shown in FIG. 3 to allow the possibility of both direct drive and independent drive through a subsidiary drive pinion.

A small subsidiary differential gear train 160 is positioned between the bevelled ends 273 and 274 of the drive shaft 223 and worm gear 222 respectively. The subsidiary gear train 160 comprises an annular cage 161 that has a pair of annular differential gears 162 and 163 supported in a parallel coaxially spaced apart manner about two diametrically opposed differential pinions 164 and 165 that are rotatably located within apertures in the cage 162. The exterior surface 166 of the cage 162 is geared to mesh with a bevelled gear 167 that is in turn driven by a subsidiary socket 168 mounted to extend through the join between the body 13 of the chuck and the front face 12. Suitable cut-away portions 169 are provided to accommodate the sockets 168 wall of the outer plate 12 of the chuck. The bevelled end 273 of the drive shaft 223 meshes with the differential gear 162 and the bevelled end 274 of the worm gear 222 is arranged to mesh with the opposed differential gear 163.

In normal operation when independent adjustment of the jaws is not required, drive to each pair of jaws will be imparted through their respective drive shafts 223 or 224 which will cause rotation of both differential gears through the differential pinions 164 and 165 to cause rotation of the worm gear 222 to, in turn, cause radial displacement of the jaws. The primary differential 50, 51 operates as in the chuck of the first embodiment so that when one pair of jaws abuts the workpiece the respective differential gear of the primary differential is stopped allowing the other pair of jaws to move on rotation of the other differential gear until that pair of jaws also engages the workpiece. In this situation the subsidiary differential 160 continues to impart direct rotation and does not come into operation. However when it is intended to independently adjust each jaw a key can be positioned in the subsidiary socket 168 and the socket rotated to cause the differential cage 161 to rotate. The gearing of the whole assembly is such that as the differential cage rotates the differential gear 162 that is coupled to the drive shaft 223 will not rotate but the other differential gear 163 that is coupled through the worm 222 to the jaw will rotate thereby causing the jaw to radially move to the desired position. A calibrated scale (not shown) is provided on the outer surface of the chuck to ensure a positive indication of the amount of movement so that the jaw can be returned to its self-centering position when separate adjustment is not required. The subsidiary differential gear train 160 illustrated in FIG. 3 is duplicated for each jaw of the chuck. The physical arrangement of the subsidiary differential gear trains is uniform throughout the chuck to ensure that as the chuck rotates there are no out of balance forces. Although not shown in detail it is understood that a suitable locking means will be provided to lock the subsidiary socket 168 in engagement with the cage 161 of the subsidiary differential 160 when normal drive is being imparted to the jaws. Without this locking means there is a danger that drive to the jaws would be lost because the drive shaft 223 may cause the cage 161 to rotate.

One of the features of the chuck described above is that when the first pair of jaws engages the workpiece the drive that is apportioned to the other pair of jaws through the differential gear train will double the speed of movement of that pair of jaws because the differential has the effect of apportioning the drive between each pair.

In order to vary the speed of movement of the jaws of the chuck the diameter of each pair 36 or 37 of drive pinions may be varied so that when one pinion 36 of one pair is selected a fast drive is imparted to the jaws and when one 37 of the other pair is selected a slower drive is imparted to the jaws.

The housing 10 is also provided with an inner sleeve 80 that acts to seal the drive assembly from the axial throughway 26 and consequently has effect of preventing the entry of swarf or other debris into the area where the various gears mesh to cause the drive of the jaws. The arrangement of the jaws in the slots in the front face of the chuck together with the internal sleeve substantially reduces the amount of cleaning that is required when the chuck is in use.

The chuck described above effectively operates as a two, three and four jaw chuck. The fact that four jaws are provided in two pairs operating concentrically and that the arrangement is such that all four jaws positively engage the workpiece ensures simple, effective and positive location of the workpiece both in a situation where the workpiece has a circular cross-section or other unsymmetrical cross-sections. There is no need to separately adjust each jaw to centre the workpiece and there is no need to change the chuck for different uses. The chuck therefore becomes universal and improves the efficiency of many machine tools such as lathes, grinders, milling machines and even numerical controlled machines.

To reduce the weight of the chuck it is understood that some of the components may be made of light alloy or plastics. In particular components that do not directly transmit the load such as the differential pinions may be made of plastics. Furthermore because of the gearing of the jaw movement the stress on each component to cause a jaw to grippingly engage a workpiece can be minimised thus reducing the need for high tensile steels in many of the chuck components.

It is understood that the chuck of the present invention is not restricted to machine tools but could be employed in other situations where accurate and positive location of a workpiece or a tool is required. One such possibility is the use of a chuck of the kind described above on the hand of an automatic robot, the jaws of the chuck acting to positively locate a workpiece or tool along the or more desired axes.

Having now described our invention, what we claim is:

1. A chuck for a machine tool comprising a cylindrical housing having opposed axially inner and outer surfaces, four jaws equally spaced around the outer surface of the housing in diametrically opposed pairs, each jaw being radially displaceable, a circular scroll mounted co-axially within said housing to be axially rotatably thereto by a key operable drive pinion mounted with in the wall of the housing, said scroll carrying a pair of parallel spaced apart co-axially mounted differential gears interconnected by at least one differential pinion, the pinion being mounted on the scroll to impart rotation from the scroll to the differential gears so that said scroll is rotatable relative to each differential gear but rotation of the scroll can directly transmit the same rotation to both differential gears, each said differential gear meshing with a pair of drive shafts, each of which, in turn, drives a jaw of the chuck so that rotation of one differential gear causes linear radial movement of one pair of jaws and one pair of jaws can be moved with the other pair held stationary.

2. A chuck for holding an article or tool comprising a circular housing having four jaws spaced around the housing in diametrically opposed pairs, each jaw being radially displaceable, drive means to cause the radial displacement of the four jaws, said drive means comprising a circular scroll mounted to be rotatable within said housing, the scroll being driven by at least one key operated drive pinion, a pair of differential gears mounted in a parallel spaced apart manner coaxial with said scroll, said differential gears being interconnected by at least a pair of differential pinions spaced between and meshing with the gears and mounted on the scroll to impart motion from the scroll to the differential gears, each differential gear meshing with a pair of drive shafts, each of which, in turn, drives a jaw of the chuck so that, in use, one pair of diametrically opposed jaws is driven by the other differential gear to apportion the drive between the pairs of said jaws so that one pair may move independently of the other pair.

3. A chuck according to claim 2 wherein each drive shaft transmits linear motion to its associated jaw through a worm gear.

4. A chuck according to claim 2 wherein each jaw is provided with means to drive that jaw independently of the other jaws.

5. A chuck according to claim 4 wherein the drive to each jaw from the particular differential gear includes a subsidiary differential gear train that, in use, allows the jaw to be moved independently of the differential gear.

6. A chuck according to claim 5 wherein the subsidiary differential gear train comprises a pair of coaxially mounted differential gears, one meshing with the drive shaft and the other meshing indirectly with the jaw, the differential gears being supported within a cage by a pair of planetary gear pinions attached to the cage, and means operably externally of the chuck to rotate the cage, whereby drive from the drive shaft causes rotation of the differential gears and movement of the jaw with the cage stationary, and rotation of the cage causes rotation of the differential gear ring indirectly meshing with the jaw and thus, radial displacement of the jaw.

7. A chuck according to claim 6 wherein the means to drive the cage comprises a socket mounted on an external face of the chuck to be actuatable by a key, a calibrated scale being provided adjacent the socket to provide indication of the rotational movement of the socket.

* * * * *

UNITED STATES PATENT AND TRADEMARK OFFICE
CERTIFICATE OF CORRECTION

PATENT NO.  : 4,718,682

DATED       : January 12, 1988

INVENTOR(S) : ZILIC, Antun

It is certified that error appears in the above-identified patent and that said Letters Patent is hereby corrected as shown below:

Title page, item [76] should read as follows:

-- Inventor: Antun Zilic, 389 Police Road, Mulgrave, Victoria 3170, Australia --

Signed and Sealed this

Twenty-third Day of August, 1988

Attest:

DONALD J. QUIGG

*Attesting Officer*  *Commissioner of Patents and Trademarks*